Patented Aug. 21, 1934

1,971,318

UNITED STATES PATENT OFFICE 1,971,318

STABILIZED CHLORINATED ALIPHATIC HYDROCARBON

Leroy C. Stewart and Lee De Pree, Midland, Mich., assignors to The Dow Chemical Company, Midland, Mich., a corporation of Michigan No Drawing. Application June 28, 1932, Serial No. 619,733

5 Claims. (Cl. 23—250)

The invention relates to methods of inhibiting the decomposition of carbon tetrachloride, tetrachloroethylene and other chlorinated aliphatic hydrocarbons and to the improved product thereby obtained.

The marked tendency of carbon tetrachloride toward decomposition during storage and shipment, particularly in the presence of moisture, is well known. In general, this tendency toward decomposition is more pronounced when the carbon tetrachloride, etc., are in contact with metallic surfaces such as iron or copper. It is well recognized that such decomposition quite generally imparts to the carbon tetrachloride, etc., corrosive properties which render them objectionable for many purposes.

To overcome this difficulty it has been proposed to add to carbon tetrachloride, and various other chlorinated hydrocarbons, certain materials which are capable of inhibiting the tendency thereof toward decomposition. For example, it has been proposed to incorporate with carbon tetrachloride such compounds as benzaldehyde, cyclohexane, petroleum oil fractions, toluene, etc., whereby the tendency of the carbon tetrachloride toward decomposition is suppressed. However, the use as decomposition inhibitors of compounds such as the foregoing has not been especially advantageous, principally because of the relatively large proportion of the inhibitor that must be included with carbon tetrachloride to effectively suppress decomposition therein.

We have now found that carbon tetrachloride, tetrachloroethylene, and other chlorinated aliphatic hydrocarbons can be stabilized during storage and shipment in iron or copper containers by incorporating therewith a relatively small amount of a natural resin.

To the accomplishment of the foregoing and related ends, the invention, then, consists of the features hereinafter fully described and particularly pointed out in the claims, the following description setting forth in detail one mode of carrying out the invention, such disclosed mode illustrating, however, but one of various ways in which the principle of the invention may be used.

The proportion of the natural resin which we have found sufficient in admixture with carbon tetrachloride and tetrachloroethylene to suppress decomposition, is exceedingly small, e. g. between about 0.006 and 0.13 per cent by weight.

The following table I shows the decomposition inhibiting effect of incorporating approximately 0.06 per cent by weight of certain resins with carbon tetrachloride. As a measure of the decomposition occurring in the carbon tetrachloride during contact with iron and copper, we have determined the milligrams of metal corroded away per square decimeter of area exposed to the action of the tetrachloride at refluxing temperature for 46 hours in the presence of water. The tests were conducted by partially immersing a weighed and measured strip of metal in 50 milliliters of the carbon tetrachloride containing the inhibitor in a round-bottomed flask, adding about 20 milliliters of water to the mixture in the flask, connecting the flask to a refluxing column, and heating the contents thereof at refluxing temperature.

Table I

| Inhibitor | Milligrams loss per square decimeter | | | |
|---|---|---|---|---|
| | Copper | | Iron | |
| | Blank | Inhibitor | Blank | Inhibitor |
| Gum mastic | 14,800 | 77 | 1,990 | 106 |
| Sandarac | 14,800 | 5,770 | 1,990 | 177 |
| Rosin | 14,800 | 148 | 1,990 | 8 |

Table II shows the decomposition inhibiting effect of incorporating approximately 0.06 per cent by weight of gum mastic with various chlorinated aliphatic hydrocarbons. The amount of decomposition occurring in the chlorinated hydrocarbons was determined in substantially the same manner as in the preceding table.

Table II

| Hydrocarbon | Milligrams loss per square decimeter | | | |
|---|---|---|---|---|
| | Copper | | Iron | |
| | No inhibitor | Mastic | No inhibitor | Mastic |
| CCl₄ | 14,800 | 77 | 1,990 | 106 |
| C₂Cl₄ | 412 | 19 | 92 | 51 |
| CHCl₃ | 231 | 173 | 96 | 13 |
| C₂H₄Cl₂ | 43 | 11 | 108 | 78 |

From the foregoing tables it is readily to be seen that the incorporation of a relatively small amount of a resin, e. g. gum mastic, rosin, etc., with chlorinated aliphatic hydrocarbons results in a distinct reduction of the decomposition occurring therein when the hydrocarbon is in contact with iron and copper even under the extremely severe conditions of continuous refluxing of a 46 hour period of time in the presence of water. Further, we have determined that a similar benefit inures to the aforementioned hydrocarbons from the admixture therewith of a similar resin when in contact with other metals, for example zinc, Monel metal, tin, etc.

Particularly to be noted is the effect of gum mastic upon the decomposition rate of carbon tetrachloride in contact with copper and the effect of rosin upon such rate in contact with iron, both rates being reduced thereby to a negligible quantity.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. A composition of matter comprising a chlorinated aliphatic hydrocarbon and between about 0.006 and about 0.13 per cent by weight of a natural resin.

2. A composition of matter comprising a chlorinated aliphatic hydrocarbon and between about 0.006 and 0.13 per cent by weight of a natural resin from the class consisting of gum mastic, rosin and sandarac.

3. A composition of matter comprising a chlorinated aliphatic hydrocarbon and about 0.06 per cent by weight of a natural resin from the class consisting of gum mastic, rosin and sandarac.

4. A composition of matter comprising carbon tetrachloride and about 0.06 per cent by weight of a natural resin from the class consisting of gum mastic, rosin and sandarac.

5. A method of inhibiting the decomposition of chlorinated aliphatic hydrocarbons which consists in incorporating therewith about 0.06 per cent by weight of a natural resin from the class consisting of gum mastic, rosin and sandarac.

LEROY C. STEWART.
LEE DE PREE.